United States Patent
Noh et al.

(10) Patent No.: US 8,699,318 B2
(45) Date of Patent: Apr. 15, 2014

(54) METHOD OF TRANSMITTING CYCLIC PREFIX LENGTH INFORMATION

(75) Inventors: Min Seok Noh, Anyang-si (KR); Yeong Hyeon Kwon, Anyang-si (KR); Jin Sam Kwak, Anyang-si (KR); Dong Cheol Kim, Anyang-si (KR); Sung Ho Moon, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 12/812,574

(22) PCT Filed: Dec. 30, 2008

(86) PCT No.: PCT/KR2008/007793
§ 371 (c)(1),
(2), (4) Date: Jul. 12, 2010

(87) PCT Pub. No.: WO2009/091144
PCT Pub. Date: Jul. 23, 2009

(65) Prior Publication Data
US 2010/0284339 A1    Nov. 11, 2010

Related U.S. Application Data

(60) Provisional application No. 61/021,632, filed on Jan. 17, 2008, provisional application No. 61/030,559, filed on Feb. 21, 2008.

(30) Foreign Application Priority Data

Mar. 21, 2008 (KR) ........................ 10-2008-0026381

(51) Int. Cl.
*H04J 11/00* (2006.01)

(52) U.S. Cl.
USPC ............................................ 370/208; 370/389

(58) Field of Classification Search
None
See application file for complete search history.

(56) References Cited

U.S. PATENT DOCUMENTS

| | | | |
|---|---|---|---|
| 6,678,316 B1 * | 1/2004 | Helms et al. | 375/222 |
| 6,876,675 B1 * | 4/2005 | Jones et al. | 370/509 |
| 7,859,988 B2 * | 12/2010 | Yang et al. | 370/208 |
| 2006/0013325 A1 | 1/2006 | Agrawal et al. | |
| 2006/0088120 A1 | 4/2006 | Hansen et al. | |
| 2007/0002726 A1 | 1/2007 | Zangi | |
| 2007/0002878 A1 | 1/2007 | Moorti et al. | |
| 2007/0147226 A1 * | 6/2007 | Khandekar et al. | 370/208 |
| 2008/0043613 A1 * | 2/2008 | Yang et al. | 370/208 |
| 2008/0095195 A1 * | 4/2008 | Ahmadi et al. | 370/478 |

* cited by examiner

*Primary Examiner* — Jianye Wu
(74) *Attorney, Agent, or Firm* — Birch, Stewart, Kolasch & Birch, LLP (57) ABSTRACT

A method of transmitting cyclic prefix length information when wireless access systems having different cyclic prefix lengths coexist is disclosed. The method of transmitting cyclic prefix length information comprises including the cyclic prefix length information in a preamble; and transmitting the preamble to a receiving end, whereby a transmitter can notify the receiving end of a current cyclic prefix length. Also, in a specific interval where a super frame header is defined, a single cyclic prefix length is used in a legacy support mode and a legacy disable mode, and cyclic prefix length information of other data or control channel is included in the super frame header and then transmitted to the receiving end. If different CP lengths are used in a legacy support mode of an evolved system, it is possible to solve a problem in detecting a control channel or a data channel, which may occur as the CP lengths are not distinguished from each other after preamble detection.

11 Claims, 6 Drawing Sheets

METHOD OF TRANSMITTING CYCLIC PREFIX LENGTH INFORMATION

This application is the National Phase of PCT/KR2008/007793 filed on Dec. 30, 2008, which claims priority under 35 U.S.C. 119(e) to U.S. Provisional Application No. 61/021,632 filed on Jan. 17, 2008 and U.S. Provisional Application No. 61/030,559 filed on Feb. 21, 2008 and under 35 U.S.C. 119(a) to Patent Application No. 10-2008-0026381 filed in Republic of Korea on Mar. 21, 2008, all of which are hereby expressly incorporated by reference into the present application.

TECHNICAL FIELD

The present invention relates to a method of transmitting cyclic prefix length information when wireless access systems having different cyclic prefix lengths coexist.

BACKGROUND ART

Hereinafter, general cyclic prefix (CP) used during data symbol transmission will be described in brief.

Figure 1:
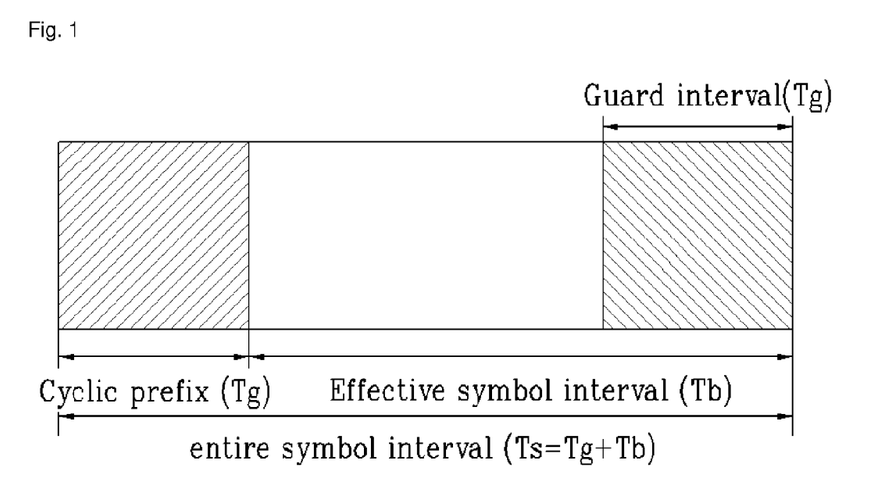
FIG. 1 is a diagram illustrating a symbol structure which includes cyclic prefix symbol.

FIG. 1 is a diagram illustrating an example of a symbol structure which includes a cyclic prefix symbol.

A cyclic prefix symbol is used to prevent inter symbol interference (ISI) from occurring and prevent inter subcarrier orthogonality from being destroyed in an orthogonal frequency division multiplexing (OFDM) mode which is a multiple carrier modulation mode.

For example, while each symbol is being transmitted through a multi-path channel, a guard interval longer than delay spread of a channel is inserted between continuous symbols. At this time, to prevent inter subcarrier orthogonality from being destroyed, a signal of the last interval (i.e., guard interval) of an effective symbol interval is copied to be inserted into the front of the symbol. This will be referred to as a cyclic prefix symbol.

Referring to FIG. 1, a symbol period (Ts) becomes a sum of an effective symbol interval (Tb) and a guard interval (Tg). A receiving end performs demodulation by selecting data corresponding to the effective symbol interval after removing the guard interval. A transmitter and the receiving end can be synchronized with each other using the cyclic prefix symbol, and can maintain orthogonality between data symbols.

Currently, a wireless access system is not equally used for all communication environments. There are one or more providers which provide respective wireless access systems. Different cyclic prefix symbol lengths may be used by the respective wireless access systems. Also, with the development of technology, a wireless access system provided to a single provider can be designed to have a length different from that of the existing cyclic prefix symbol.

A legacy system means a system conventionally defined. An evolved system means a system evolved from the legacy system or a system newly defined.

The evolved system can be divided into a legacy support mode and a legacy disable mode, wherein the legacy support mode supports the legacy system and the legacy disable mode supports the evolved system only.

The legacy support mode means a mode supported by the evolved system for compatibility with the existing wireless access system. Namely, the legacy support mode means that the evolved system supports the legacy system in transmission and reception between the evolved system and the legacy system. The legacy support mode can be divided into two types.

One type of the legacy support mode means that a legacy base station and a legacy mobile station can communicate with each other without being affected by the evolved system. Also, one type of the legacy support mode means a status where the legacy base station and the legacy mobile station can communicate with each other.

The other type of the legacy support mode means a status where a base station that can support both the legacy system and the evolved system can perform data communication with both the legacy mobile station and an evolved mobile station.

However, a problem may occur in the legacy support mode when different cyclic prefix lengths are used for the legacy system and the evolved system. For example, the evolved mobile station does not know whether a current mode is a legacy support mode or a legacy disable mode after detecting an evolved preamble. Namely, since the evolved mobile station cannot know CP length information, the evolved mobile station fails to exactly detect a control channel or a data channel.

DISCLOSURE OF INVENTION

Technical Problem

Accordingly, the present invention is directed to a method of transmitting cyclic prefix length information, which substantially obviates one or more problems due to limitations and disadvantages of the related art.

An object of the present invention is to provide a method of transmitting cyclic prefix length information, in which an evolved system supports both a legacy support mode and a legacy disable mode.

Another object of the present invention is to provide a method of transmitting cyclic prefix length information when different cyclic prefix lengths are used for an evolved region and a legacy region.

Technical Solution

In order to solve the above technical problems, the present invention relates to a method of transmitting cyclic prefix length information when wireless access systems having different cyclic prefix lengths coexist.

In one aspect of the present invention, a method of transmitting cyclic prefix length information in a wireless access system having different cyclic prefix lengths comprises including the cyclic prefix length information in a preamble; and transmitting the preamble to a receiving end.

The cyclic prefix length information is included in the preamble using one of phase modulation and sequence shifting. Also, the cyclic prefix length information is included in the preamble using one of phase rotation, sequence index differentiation, and shift information. The cyclic prefix length information is included in the preamble using one of Walsh code, discrete Fourier transform, and orthogonal symbol.

In another aspect of the present invention, a method of transmitting cyclic prefix length information in a wireless access system having different cyclic prefix lengths comprises including the cyclic prefix length information in a super frame header; and transmitting the super frame header to a receiving end.

The super frame header is a frame header. Also, the super frame header includes a preamble and a control channel, and the cyclic prefix length information is included in the control channel. In this case, the control channel is a broadcast channel which includes system information.

Also, the preamble and the control channel are included in one subframe, and the control channel of the subframe has a fixed cyclic prefix length.

In still another aspect of the present invention, a method of transmitting cyclic prefix length information if different cyclic prefix lengths are used for a legacy region and an evolved region comprises including the cyclic prefix length information used in the evolved region in a preamble; and transmitting the preamble to a receiving end.

The preamble of the evolved region is included in a super frame header, and the super frame header further includes a control channel.

Also, the control channel includes system information and the cyclic prefix length information, and a fixed cyclic prefix length is used for the preamble to the control channel. In this case, the fixed cyclic prefix length is 1/16 of a symbol length.

Also, the cyclic prefix length used in the legacy system is 1/8 of a symbol length, and the cyclic prefix length used in the evolved system is 1/16 of the symbol length.

Advantageous Effects

According to the present invention, the following effects can be obtained.

First of all, when a legacy support mode of an evolved system uses different CP lengths, it is possible to solve a problem in detecting a control channel or a data channel, which may occur as the CP lengths are not distinguished from each other after preamble detection.

Second, since a preamble, which includes CP length information through phase modulation, is transmitted to a mobile station, the mobile station can detect a control channel using a suitable CP length from the legacy system or the evolved system.

Third, since CP lengths are equally provided to a control channel including CP length information in accordance with one format, it is possible to easily detect control information or data.

MODE FOR THE INVENTION

To solve the aforementioned technical problems, the present invention is directed to a method of transmitting cyclic prefix length information when wireless access systems having different cyclic prefix lengths coexist.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as user equipment and a mobile subscriber station.

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Specific terminologies hereinafter described are provided to assist understanding of the present invention, and various modifications can be made in the specific terminologies within the range that they do not depart from technical spirits of the present invention.

Hereinafter, in the embodiments of the present invention, it is assumed that IEEE 802.16e system is a legacy system and IEEE 802.16m system is an evolved system. Also, in the embodiments of the present invention, a length of CP is assumed as follows. For example, in a legacy region of a legacy support mode, 1/8 of a symbol length is used as CP length. In an evolved region, 1/16 of a symbol length is used as CP length. Also, in a legacy disable mode, 1/16 of a symbol length is used as CP length. Of course, different lengths can be used as CP lengths in accordance with requirements of a user or channel status.

Figure 2:
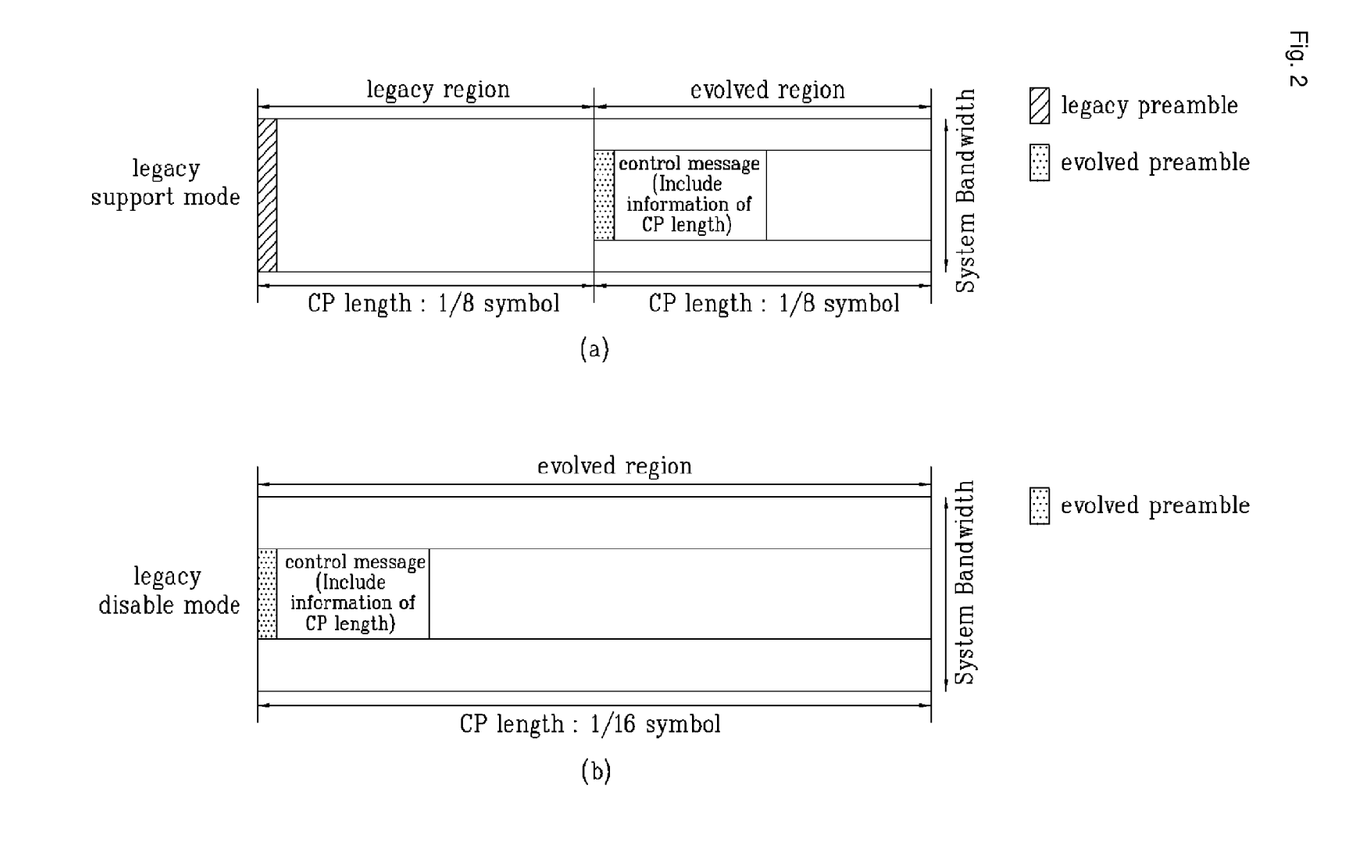
FIG. 2 is a diagram illustrating a legacy support mode (*a*) and a legacy disable mode (*b*) in accordance with one embodiment of the present invention.

FIG. 2 is a diagram illustrating a legacy support mode (a) and a legacy disable mode (b) in accordance with one embodiment of the present invention.

FIG. 2(a) illustrates that CP length (⅛ symbol) equal to CP length used in the existing legacy system is used in the legacy support mode of the evolved system. Referring to FIG. 2(a), one or more kinds of bit information that can divide CP length is inserted to a preamble of the evolved system to identify a legacy support mode from a legacy disable mode. At this time, the modes use different CPs.

At this time, a base station can represent CP length information by adding a specific signature to an evolved preamble. For example, the base station can include CP length information in the evolved preamble using phase modulation or sequence shifting.

Furthermore, if a plurality of OFDM symbols are used, the base station can transmit CP information using sequence mapping relation included in each OFDM symbol. For example, the base station can include CP length information in the evolved preamble using phase rotation, sequence index differentiation or shift information.

Furthermore, the base station can transmit CP information to the mobile station using covering sequence in a plurality of OFDM symbols. For example, the base station can include CP length information in the evolved preamble using Walsh code, discrete Fourier transform matrix or various orthogonal symbols in a plurality of symbols.

Figure 3:
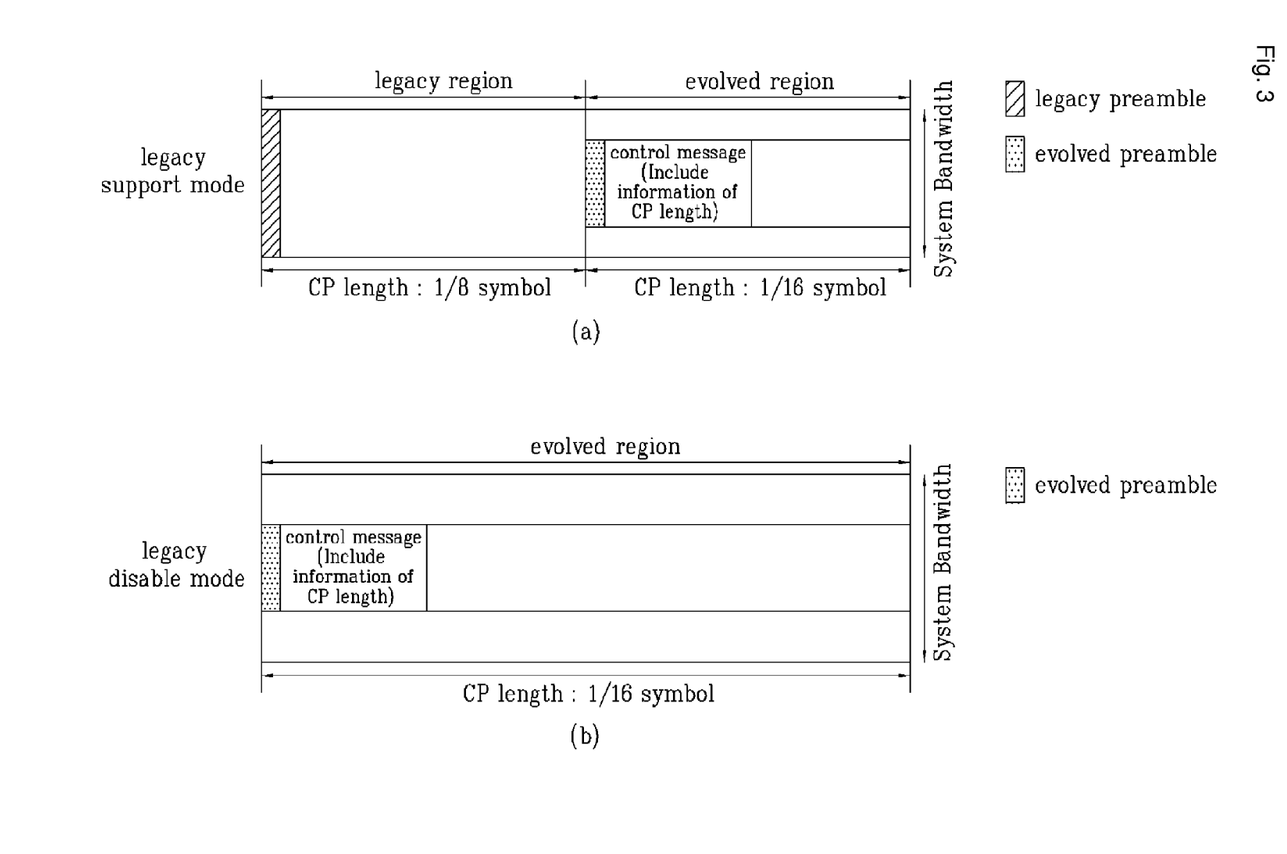
FIG. 3 is a diagram illustrating a legacy support mode (*a*) and a legacy disable mode (*b*) in accordance with another embodiment of the present invention.

FIG. 3 is a diagram illustrating a legacy support mode (a) and a legacy disable mode (b) in accordance with another embodiment of the present invention.

Referring to FIG. 3(a), if a legacy region and an evolved region are used together in the legacy support mode, it is possible to notify CP length changed in the evolved region by including information on CP length different from that of the legacy system in the evolved preamble. For example, if one bit is used, it can represent only the presence of the legacy support mode or the legacy disable mode. If bits more than one are used, it is possible to identify a length of each CP used in the legacy support mode and the legacy disable mode.

At this time, the base station can represent CP length information by adding a specific signature to the evolved preamble. For example, the base station can include CP length information in the evolved preamble using phase modulation or sequence shifting.

Furthermore, if a plurality of OFDM symbols are used, the base station can transmit CP information using sequence mapping relation included in each OFDM symbol. For example, the base station can include CP length information in the evolved preamble using phase rotation, sequence index differentiation or shift information.

Furthermore, the base station can transmit CP information to the mobile station using covering sequence in a plurality of OFDM symbols. For example, the base station can include CP length information in the evolved preamble using Walsh code, discrete Fourier transform matrix or various orthogonal symbols in a plurality of symbols.

Referring to FIG. 2(b) and FIG. 3(b), it is possible to use a cyclic prefix length of 1/16 symbol length in the legacy disable mode of the evolved system. A method of including CP length information used in the evolved system in the evolved preamble has been described in FIG. 2 and FIG. 3. However, the CP length information used in the evolved system can be included in the legacy preamble in accordance with a user s requirements or system status.

Figure 4:
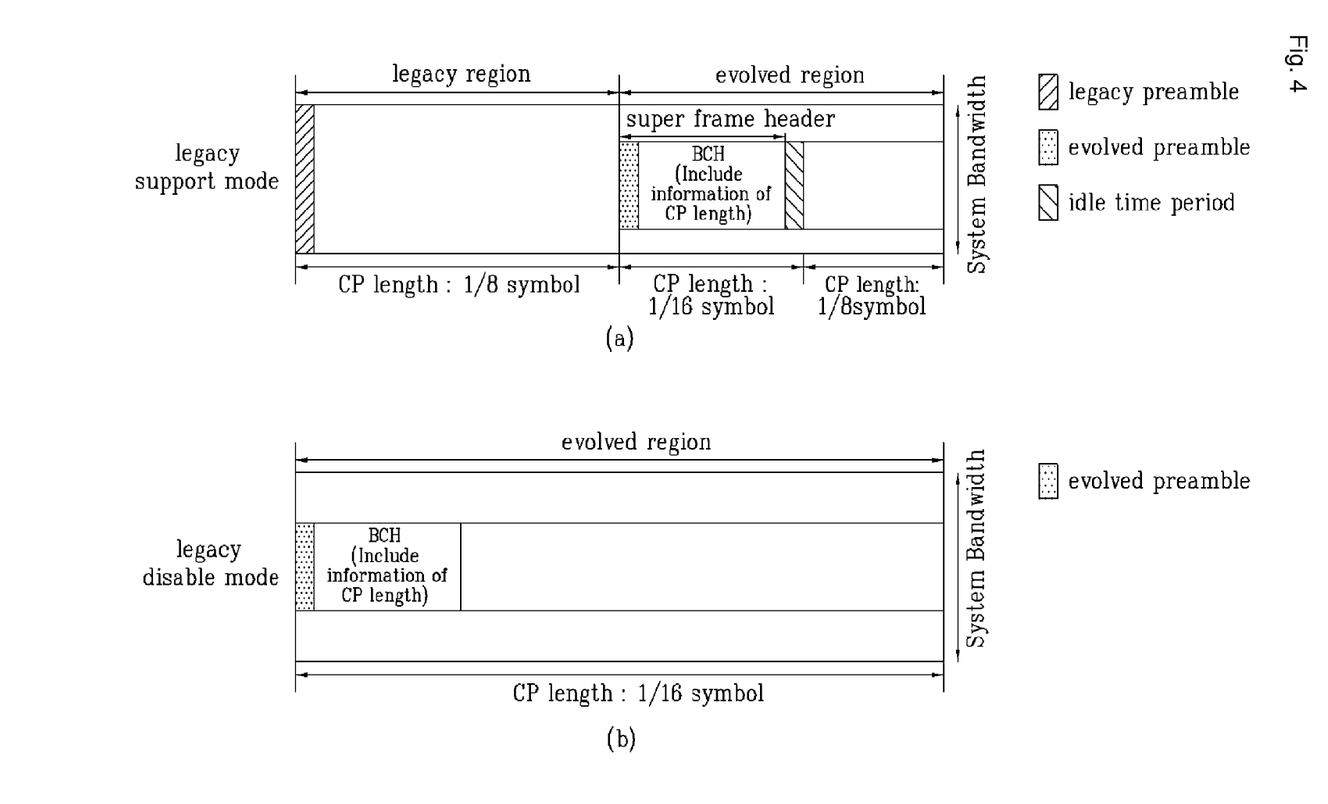
FIG. 4 is a diagram illustrating a legacy support mode (*a*) and a legacy disable mode (*b*) in accordance with still another embodiment of the present invention.

FIG. 4 is a diagram illustrating a legacy support mode (a) and a legacy disable mode (b) in accordance with still another embodiment of the present invention.

FIG. 4(a) illustrates a legacy support mode which includes a legacy region and an evolved region in the evolved system. In this case, a CP length different from that of the legacy region can be used in the evolved region. Also, FIG. 4(b) illustrates a legacy disable mode transmitted from the evolved system in accordance with a single mode format (for example, CP length of legacy disable mode).

FIG. 4(a) illustrates a method of fixing a CP length of the evolved region for a specific OFDM symbol interval. In this case, the specific OFDM symbol interval means an interval from a specific frame (or subframe) to a control channel that can identify CP length information. In the embodiments of the present invention, the control channel can include a broadcast channel (BCH) which transfers system information.

At this time, in the evolved region of the legacy support mode, a CP length of 1/16 symbol length used in the legacy disable mode can be used for the OFDM symbol interval to the control channel which includes CP length information of the evolved system. Accordingly, it is not necessary for the evolved region of the legacy support mode to classify the CP length to the control channel which includes CP length information.

In FIG. 4(a), an interval for transmitting broadcast channel information (BCH) which includes information of preamble and system configuration can be defined by a super frame header (or frame header). The same sized CP length can be used for both the legacy support mode and the legacy disable mode of the evolved system for the super frame header interval. Namely, the same CP length can be used for the legacy support mode and the legacy disable mode for an interval (super frame header interval) of a fixed length. Also, a synchronous channel (or broadcast channel for system information) defined by one CP format for a fixed interval can be defined by a specific transmission interval (for example, subframe) within a frame.

In FIG. 4(a), for a data channel or a control channel after detecting CP length information, it is possible to identify whether the current system is in a legacy support mode or a legacy disable mode, through CP length information included in the control channel where detection has been previously performed. Namely, a receiving end can detect the data channel and the control channel using the CP length information. Also, if the CP length is reduced for the interval to the specific symbol which includes the CP length information, as illustrated in FIG. 4(a), the other symbol intervals can be used as idle time period.

The idle time period can be arranged at the last location of the fixed interval. This is because that the idle time period can be used to divide different CP lengths from each other. However, the idle time period can be arranged at a random location in the fixed interval, and a part of the idle time period can be distributed in CP of OFDM symbols within the fixed interval so that the part can be defined as extended CP suitable for delay spread.

In FIG. 4, after transmitting data to the receiving end using the symbol structure of FIG. 3(a), the data can be transmitted to the receiving end using the symbol structure of FIG. 4(a). At this time, since the fixed CP length is used for the channel which includes the CP length information, the CP length information may not be included in the evolved preamble.

Figure 5:
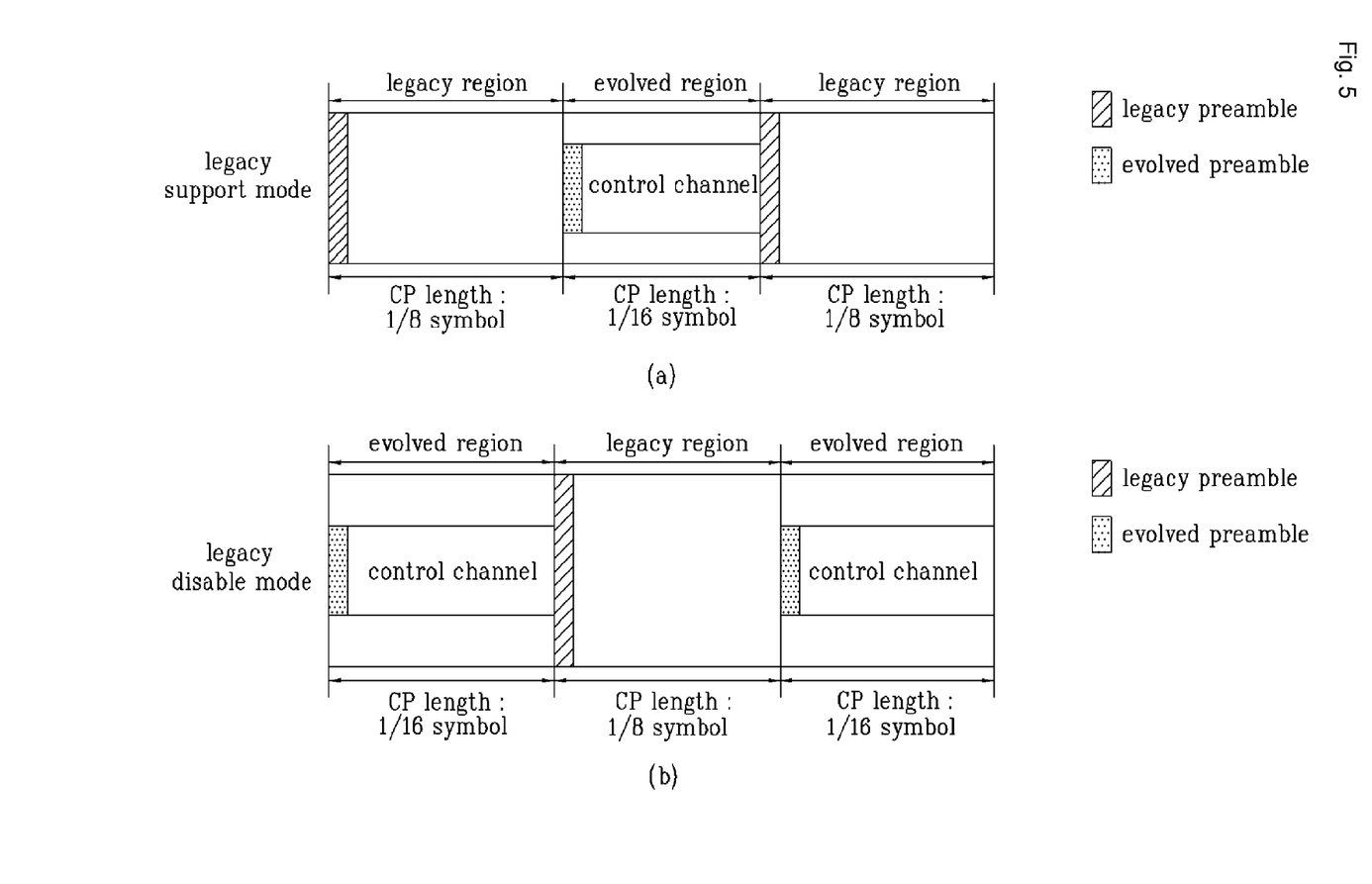
FIG. 5 is a diagram illustrating a legacy support mode (*a*) and a legacy disable mode (*b*) in accordance with further still another embodiment of the present invention.

FIG. 5 is a diagram illustrating a legacy support mode (a) and a legacy disable mode (b) in accordance with further still another embodiment of the present invention.

Referring to FIG. 5(a), the legacy support mode can include one or more legacy regions and an evolved region. In this case, although a CP length corresponding to ⅛ symbol length of OFDM symbol can be used in the legacy region, a CP length (for example, 1/16 symbol length) different from the CP length used in the legacy region can be used in the evolved region. The receiving end can exactly detect a control channel or a data channel in the legacy support mode using the CP length information included in the evolved preamble.

Referring to FIG. 5(b), the legacy support mode can include one or more evolved regions and a legacy region. In this case, different CP lengths can be used for the legacy region or the evolved region. Namely, the receiving end can detect a control channel or a data channel using the information of different CP lengths included in the evolved preamble or the legacy preamble.

In FIG. 5, the method of transmitting the evolved preamble from the transmitter to the receiving end has been described, wherein the evolved preamble includes information of different CP lengths used in the legacy region and the evolved region. However, CP of 1/16 symbol length can be used for the fixed interval in the evolved region included in the legacy support mode of FIG. 5. At this time, the fixed interval means an interval from the evolved preamble to the control channel that can identify CP length information.

Furthermore, according to the further still another embodiment of the present invention, the symbol structures of FIG. 5(a) and FIG. 5(b) can be used. For example, the legacy preamble and the evolved preamble of FIG. 5(a) and FIG. 5(b) can include their respective CP length information. In this case, the receiving end can exactly detect the control channel or the data channel even though the CP length is changed. If the first evolved preamble has the CP length information used in the evolved region in FIG. 5(b), the fixed CP length (i.e., CP length of the evolved region) can be used for the control channel which includes CP length information, in the next evolved region.

Figure 6:
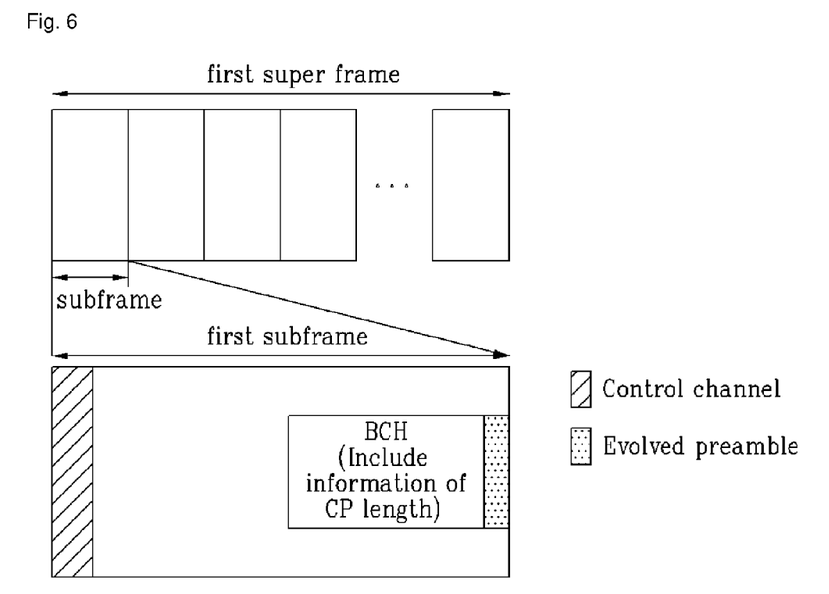
FIG. 6 is a diagram illustrating a location of a super frame header that can be used in the embodiments of the present invention.

FIG. 6 is a diagram illustrating a location of a super frame header that can be used in the embodiments of the present invention.

The super frame header represents an information unit transmitted per super frame.

The super frame header can include a preamble and a control message. The control message can include a broadcast channel (BCH) which includes system information.

At this time, one super frame can include one or more subframes and each of the subframes can include one or more OFDM symbols. Preferably, one super frame can include four frames and each of the frames can include eight subframes. Namely, one super frame can include thirty-two (32) subframes. Also, one subframe can preferably include six OFDM symbols.

The super frame header can have a scalable bandwidth so that it can apply to various bandwidths. Accordingly, the super frame header can be allocated in a unit of minimum bandwidth. If the system bandwidth is greater than an allocated bandwidth of the super frame header, data can be allocated to other bandwidths except for the bandwidth allocated to the super frame header.

Furthermore, the super frame header includes important system information of which detection reliability should be high. Accordingly, a detection throughput can be improved by applying power boosting to the super frame header.

Referring to FIG. 6, in the frame structure, it is preferable that the super frame header is included in the first subframe among the subframes included in the super frame. This is because that system information should first be detected on a time axis. At this time, a reference time of the super frame can be defined based on start or end of the subframe where the super frame header is located.

Furthermore, although it is preferable that the evolved preamble is allocated to one or several OFDM symbols arranged at the last location on the time axis within the subframe, random OFDM symbols including the first OFDM symbol of the subframe can be used. This is to allow two kinds of control signals not be overlapped with each other when the control message (for example, control message for subframe indicating allocation information, etc.) except for system information is allocated to the front of a specific transmission interval on the time axis. Namely, this is to prevent control information of subframe or frame unit and control information of super frame from being transmitted on a single OFDM symbol.

Figure 7:
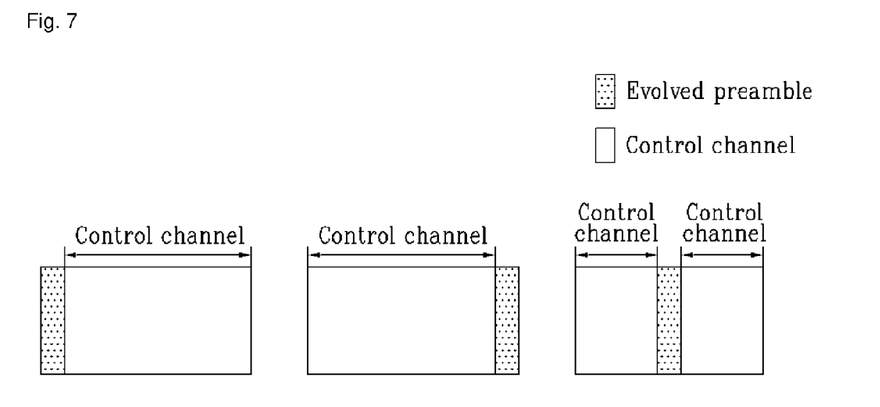
FIG. 7 is a diagram illustrating a location relation between a control channel and a preamble in a super frame header to which the embodiments of the present invention can be applied.

FIG. 7 is a diagram illustrating a location relation between a control channel and a preamble in a super frame header to which the embodiments of the present invention can be applied.

Locations of a preamble (or synchronous channel) and a control channel (or control message) within the super frame header can be changed with respect to each other on the time axis. Referring to FIG. 7, the preamble can be located at the front or rear of the control channel. Also, the preamble may be located between the control channels.

In the super frame header and the subframe to which the broadcast control message such as SCH and BCH is transmitted, the CP length for a total of subframes can be set to the CP length of the super frame header so as to support a plurality of CP lengths. Also, the CP length can be changed for only OFDM symbols used for transmitting a preamble or the BCH. At this time, among different CP lengths, using the shorter CP length (for example, 1/16 symbol length) is preferable. Namely, since the length of the subframe is varied depending on the CP length, the shorter CP length is used so that the length of the subframe is not affected by a preamble or BCH of a fixed length. Accordingly, the idle time period may extend one CP length among OFDM symbols where CP length variation occurs within the subframe.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method of transmitting cyclic prefix length information if different cyclic prefix lengths are used for a first system region for a first communication system and a second system region for a second communication system, the method comprising:

transmitting, by a transmitting end, a superframe header to a receiving end, wherein the superframe header includes cyclic prefix length information which comprises a first cyclic prefix length and an indicator, wherein the indicator indicates whether the transmitting end supports a first communication system and a second communication system, wherein a fixed cyclic prefix length is applied up to the superframe header of the first system region of the first communication system, and the first cyclic prefix length is applied to a remaining region of the first system region, and wherein an idle time period is immediately followed by the superframe header when the fixed cyclic length and the first cyclic prefix length are different from each other.

2. The method of claim 1, wherein the superframe header is a frame header.

3. The method of claim 1, wherein the superframe header includes a preamble and a control channel, and the cyclic prefix length information is included in the control channel.

4. The method of claim 3, wherein the control channel is a broadcast channel which includes system information.

5. The method of claim 3, wherein the preamble and the control channel are included in one subframe, and the control channel of the subframe has a fixed cyclic prefix length.

6. The method of claim 1, wherein the fixed cyclic prefix length is $1/16$ of a symbol length.

7. The method of claim 1, wherein the first communication system is an IEEE (Institute of Electrical and Electronics Engineers) 802.16m system and the second communication system is an IEEE 802.16e system.

8. The method of claim 1, wherein the superframe header is located in a first system region which is for the first communication system.

9. The method of claim 1, wherein the fixed cyclic prefix length is equal to a second cyclic prefix length, and wherein the second cyclic prefix length is applied for a singular system which supports only the second communication system.

10. The method of claim 1, wherein if the transmitting end supports both the first communication system and the second communication system, the first cyclic prefix length is used in a first system region for the first communication system and is $1/16$ of a symbol length, and a third cyclic prefix length is used in a second system region for the second communication system and is $1/8$ of a symbol length.

11. A method of receiving cyclic prefix length information if different cyclic prefix lengths are used for a first system region for a first communication system and a second system region for a second communication system, the method comprising:

receiving a superframe header of the first system region which includes the cyclic prefix length information; and determining whether a transmitting end supports both the first communication system and the second communication system based on the cyclic prefix length information, wherein the cyclic prefix information comprises a first cyclic prefix length and an indicator, wherein the indicator indicates whether the transmitting end supports both the first communication system and the second communication system, wherein a fixed cyclic prefix length is applied up to the superframe header of the first system region of the first communication system, and the first cyclic prefix length is applied to a remaining region of the first system region, and wherein an idle time period is immediately followed by the superframe header when the fixed cyclic prefix length and the first cyclic prefix length are different from each other.

* * * * *